Nov. 29, 1960 H. WARP 2,962,075
MACHINE FOR FORMING LOUVERED MATERIAL
Filed Oct. 26, 1955 3 Sheets-Sheet 1

INVENTOR.
Harold Warp.
BY Schroeder, Hofgren,
Brady & Wegner Atty's.

Nov. 29, 1960     H. WARP     2,962,075
MACHINE FOR FORMING LOUVERED MATERIAL
Filed Oct. 26, 1955     3 Sheets-Sheet 2
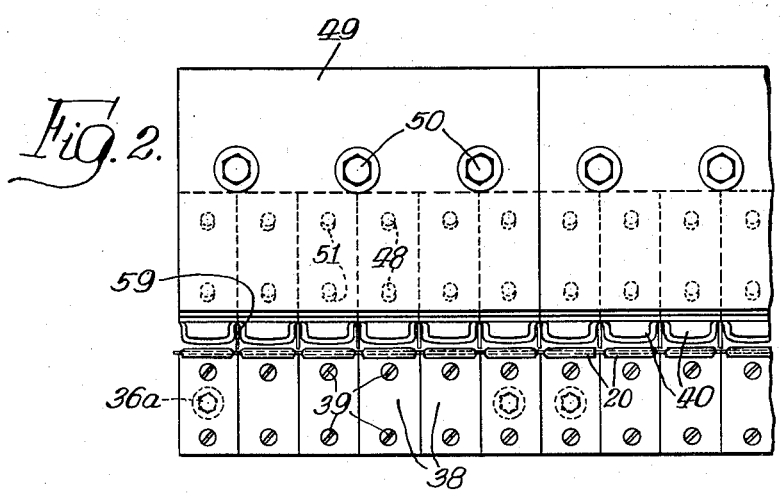
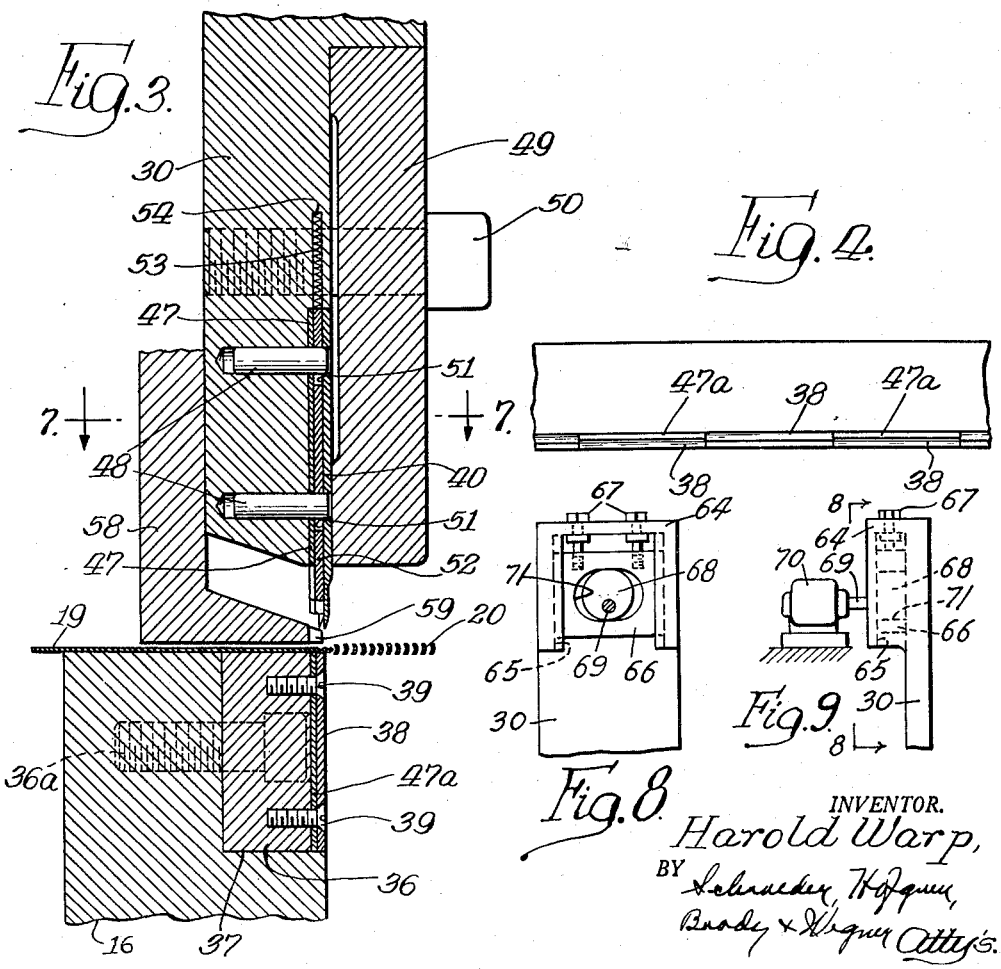
INVENTOR.
Harold Warp,
BY Schroeder, Hofgren, Brady & Wegner Attys.

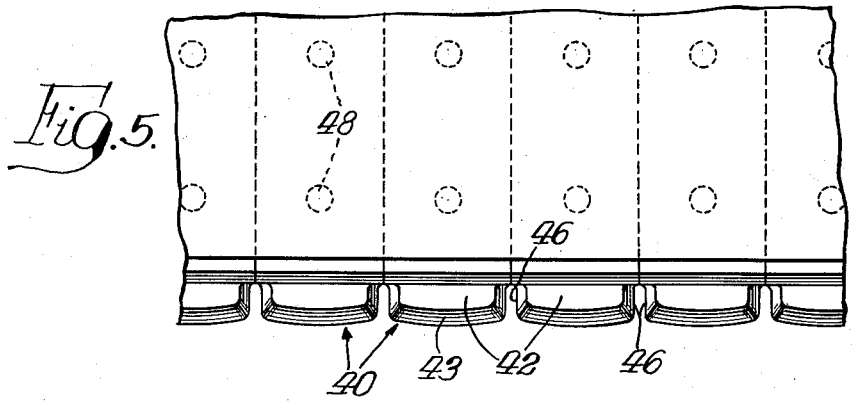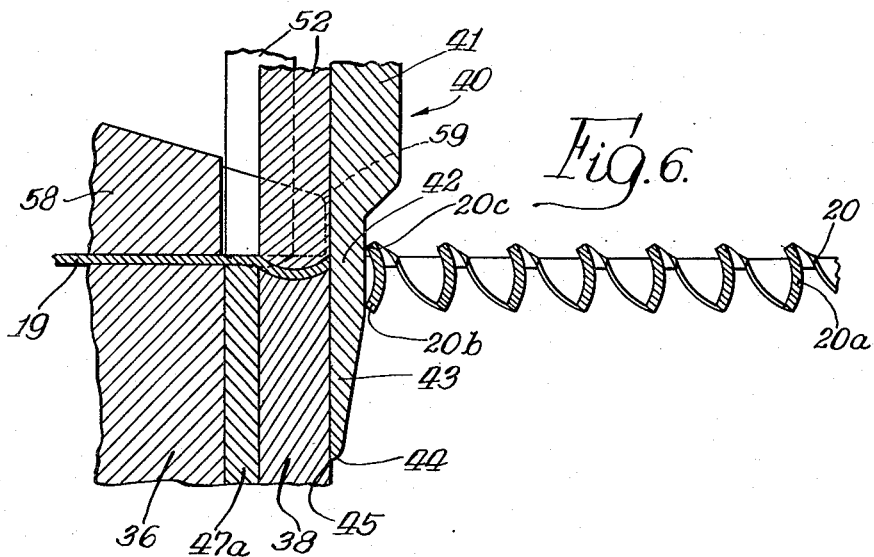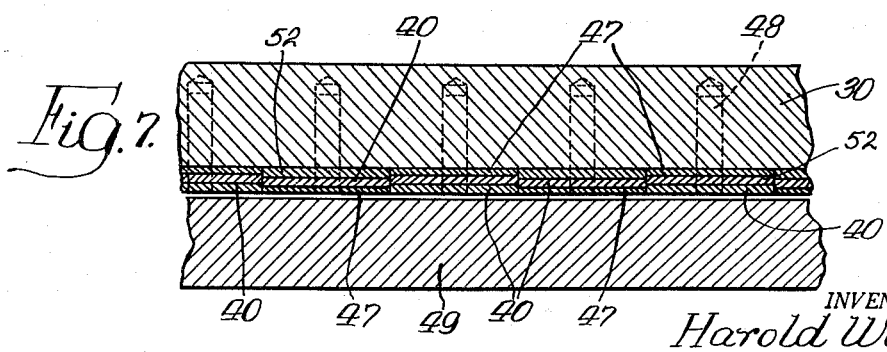

United States Patent Office 2,962,075
Patented Nov. 29, 1960

2,962,075

MACHINE FOR FORMING LOUVERED MATERIAL

Harold Warp, Chicago, Ill., assignor to Flex-O-Glass, Inc., a corporation of Illinois Filed Oct. 26, 1955, Ser. No. 542,801

16 Claims. (Cl. 153—2)

The invention relates to a machine for forming louvered material and has as a general object to provide a new and improved machine of that character capable of producing a sheet material having a large number of louvers per inch.

A more particular object of the invention is to provide a machine that cuts and forms, i.e., turns the louver elements out of the plane of the sheet, by one and the same means and as part of the same operation.

Another object is to provide a machine of the character described in which the width of the louver elements is varied simply by varying the feed given the sheet in each cutting and forming cycle of operation.

A further object is to provide a machine of the character described in which the pitch of the louver elements may be varied while employing the same cutting and forming means.

Still another object is to provide a machine having means for shaping the louver elements, such means being in addition to the cutting and forming means and thus operable and variable to obtain any desired shape of the louver elements.

Yet another object is to cut and form the louver elements by a punch press operation, with the number of elements per inch and the pitch of the elements determined by adjustment of the feed of the sheet from which the elements are formed, and the thickness of the cutting and forming blade in a plane parallel with the sheet and through the line of contact between the blade and the element at the time of maximum penetration of the sheet by the blade.

Other objects and advantages will become apparent from the following detailed description taken in connection with the accompanying drawings, in which:

Fig. 2 is a fragmentary elevational view taken approximately along the line 2—2 of Fig. 1.

Fig. 3 is a view similar to Fig. 1 but of a smaller portion of the machine and being drawn approximately to scale.

Fig. 4 is a plan view of the die block of Fig. 3.

Fig. 5 is a fragmentary and enlarged front elevational view of the louver cutting and forming means.

Fig. 6 is a sectional view taken in a plane at right angles to the material and approximately centrally of a single blade composing the cutting and forming means, the figure being approximately nine times normal size.

Fig. 7 is a horizontal sectional view taken along the line 7—7 of Fig. 3.

Fig. 8 is a fragmentary vertical section taken substantially along the line 8—8 of Fig. 9, illustrating one example of a variable ram stroke means.

Fig. 9 is a side elevation thereof.

Figure 1:
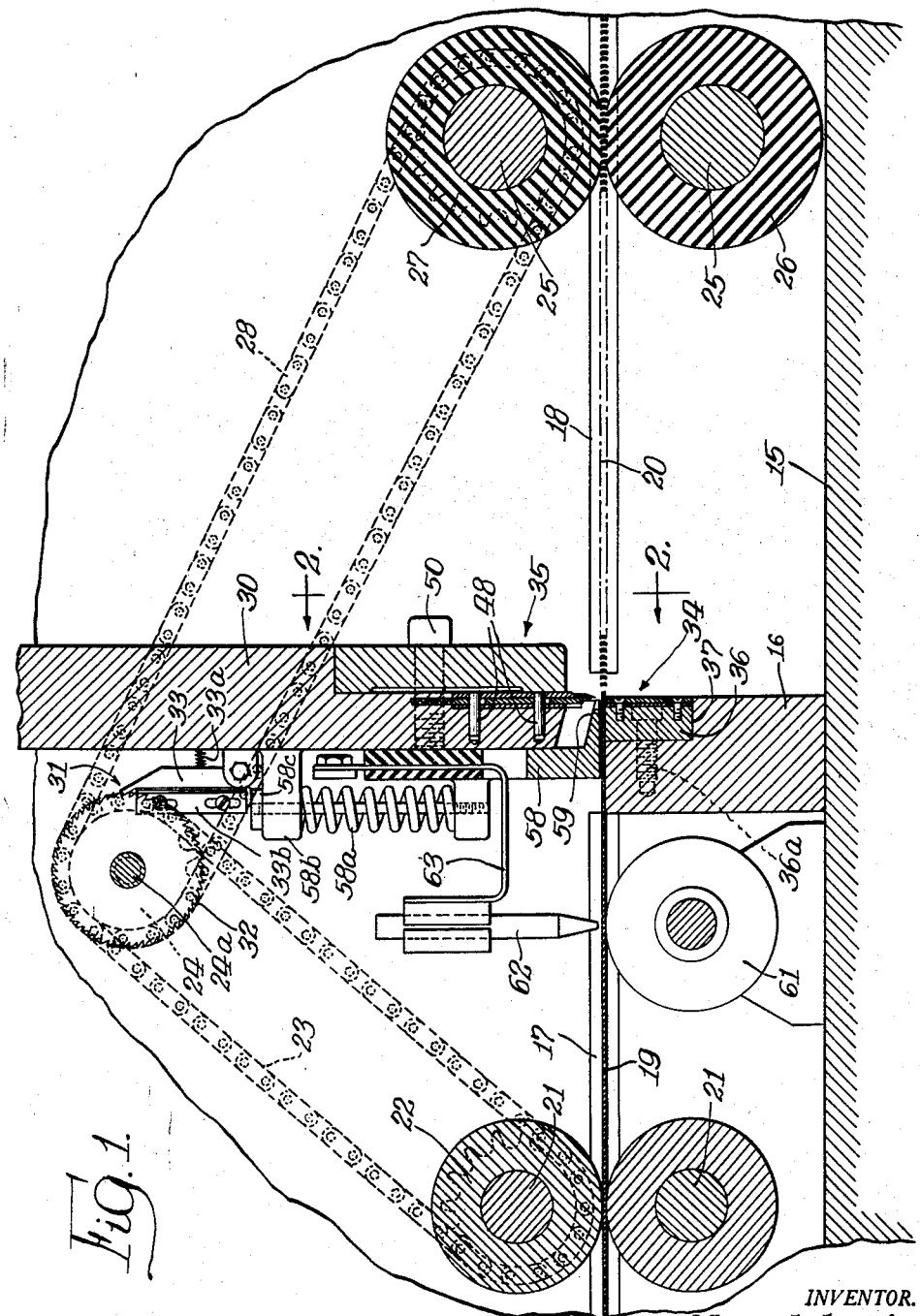
Fig. 1 is a fragmentary vertical sectional view of a machine embodying the features of the invention.

While the invention is susceptible of various modifications and alternative constructions, it is shown herein and will hereinafter be described in a preferred embodiment and one modification. It is not intended, however, that the invention is to be limited thereby to the specific constructions disclosed. On the contrary, it is intended to cover all modifications and alternative constructions falling within the spirit and scope of the invention as defined in the appended claims.

The invention disclosed herein is designed to form a louver type screen material from sheets. The finished material is in the nature of very miniature Venetian blinds such as disclosed in my Patent No. 2,366,224. Thus in studying the subsequent disclosure it should be borne in mind that there is here being dealt with sheet material of the order of .010" in thickness or less, that the louver elements may have a length of from ½" to 2" and that the mesh of the material, that is, the number of louvers per inch, may run from conventional screen size, namely, twelve, fourteen or sixteen, to forty or fifty louver elements per inch, it being one of the advantages of the invention to be able to produce extremely fine mesh screen of the louver or Venetian blind type.

Generally speaking, the invention contemplates the provision of means for intermittently feeding sheet material to and past means for slitting the sheet and forming it, the feed of the sheet being, of course, timed with the cutting or slitting and forming operations. It is contemplated and is a feature of this invention that the cutting or slitting of the sheet and the forming of the louver elements is to be done by one and the same means and as a part of one and the same operation. To that end it is contemplated that the cutting and forming be a simple punching operation with the cutting and forming means being composed of a plurality of individual elements of a width substantially equal to the desired length of the louver elements and spaced apart so as to leave between cuts a narrow, continuous strip of the sheet from which the screen is being formed. Thus the cutting and forming means converts the imperforate sheet into a material composed of a plurality of columns of louver elements divided by continuous strips with which the louver elements are integral at their ends to be supported thereby.

Herein the louver elements extend transversely of the direction of feed of the sheet. Thus the width of the screen produced is dependent entirely on the width of the sheet material available, while the length of the screen could be infinite though, of course, commercial expediency dictates that the screen have some finite length. It will be readily appreciated by those skilled in the art that the louver elements could run parallel with the feed of the sheet but that such an arrangement would have limitations.

The invention also contemplates shaping the louver elements so as to give them added strength and rigidity. Herein means is provided for shaping the elements, prior to their severance into individual elements, with the shaping means operating in timed relationship with the cutting and forming means but being otherwise independent thereof in order that there be a greater freedom in the shape that may be given to the elements.

As above stated, the cutting and forming of the louver elements is a simple punching operation and thus the machine embodying the invention may be a simple punch press. Inasmuch as those skilled in the art are fully familiar with a punch press, only the portions vital to the present invention are shown in the drawing. Suffice it to say, therefore, that the punch press has a frame 15 including a rigid transversely extending member 16 forming a backing support for a portion of the cutting and forming means, as will presently be described, and guide means 17 and 18 extending longitudinally of the machine and adapted to receive the marginal edges of the sheet material both prior to and after cutting and forming of the louver elements.

Means is provided for feeding the material, shown in its initial sheet form at 19 and in its finished screen form at 20, longitudinally through the machine. It has been found beneficial to maintain the sheet material taut while it is being cut and formed. To that end, the sheet is pulled away from the cutting and forming means as well as being fed to it. Thus there is journaled in the frame 15 a first pair of feed rollers 21 located in advance of the cutting and forming means. These rollers may have a steel or other hard surface inasmuch as they engage only the flat, imperforate sheet 19. Fixed to rotate with one of the rollers 21 is a sprocket 22 driven by a chain 23 from a drive sprocket 24 fast on a shaft 24a. The rollers 21 are preferably geared together so that both are driven from the sprocket 24 and at the same rate.

Journaled in the frame 15 beyond the cutting and forming means is a second pair of feed rollers 25. These have a rubber coating or surfacing 26 in order not to injure the louver elements of the formed material 20 while yet gripping the same so as to preclude slippage relative to the material. Again fixed to rotate with one of the rollers is a sprocket 27 driven by a chain 28 from a sprocket, not shown, similar to the sprocket 24 and also fast on the shaft 24a. It will be noted that the rollers 25 are of larger diameter than the rollers 21 but it should also be noted that the sprocket 27 is larger. Actually the proportions of the rollers 21 and the sprocket 22 and that of the rollers 25 and the sprocket 27 are such that the peripheral speeds of the rollers are the same. Thus the rollers 21 supply the main force required to feed the sheet to the cutting and forming means such as that required to unwind the material from the supply reel. With the rollers 21 acting on the sheet before it has been formed into louvered material, the sheet can take the pull that is applied without injury. The rollers 25 under these circumstances do not need to apply a large force which would injure the formed material but serve primarily to maintain the material taut during the cutting and forming operation, for it has been found that this is a substantial aid here where the die, due to the nature of the material, cannot give full support. Again rollers 25 are preferably geared together so that both are driven from the sprocket.

The rollers 21 and 25 are driven intermittently to feed the sheet intermittently in timed relationship with the operation of the cutting and forming means. To that end there is interposed between a ram 30, forming a part of the cutting and forming means, means for translating the reciprocatory movement of the ram 30 into intermittent rotary movement of the sprockets driving the chains 23 and 28. This conversion means is adjustable to vary the amount of angular movement of the sprockets for the same movement of the ram in order that the extent of feed of the sheet with each operation may be varied and thereby vary the number of louvers per inch as will presently be described in greater particularity.

While such motion converting means may take a variety of forms well known to the trade, a pawl and ratchet mechanism, generally designated 31, is herein shown by way of illustration. Fast on the shaft 24a carrying sprocket 24 and its companion sprocket is a ratchet wheel 32, while pivotally carried by the ram 30 is a pawl 33 urged into engagement with ratchet wheel 32 by means such as a spring 33a. The ratchet wheel 32 has such a number of teeth as to provide an exact feed of the sheet for cutting the particular mesh desired. Depending upon the mesh and other factors, all well known to the trade, the feed of the sheet may either be varied by employing a different ratchet wheel or by adjusting the pawl so that it is effective to take a larger or smaller bight. Operative in connection with the latter adjustment is a control member 33b adjustably positionable to vary the point in the stroke of the pawl 33 where engagement is had or broken with wheel 32.

As generally indicated above, the cutting and forming is herein designed to be in the nature of a punch press operation. To that end the cutting and forming means comprises a stationary die portion, generally designated 34, and a reciprocatory die portion, generally designated 35, carried by the ram 30. Before describing the details of the cutting and forming means, it is believed desirable that the nature of the sheet worked upon be described in order that it may be fully appreciated and also that the nature of the material sought to be produced be described. The sheets worked upon are very thin running all the way from .005" to .010" or .012" in thickness depending upon the character of the metal composing the sheet. Where the sheet is of brass or bronze the thickness is only around .005" or .006". Steel sheets run around .008", whereas sheets of aluminum run around .010" to .012".

There has already been perfected a machine for forming Venetian type screen from materials of the kind described where the mesh runs from twenty to the inch downward (see Harter Patent No. 2,596,997, dated May 20, 1952). It is a feature of this invention that a machine has been perfected which is capable of producing louvered material having meshes running as high as forty or even fifty to the inch. With forty louvers to the inch, it will immediately be apparent that each louver element is but .025" wide yet this machine has been designed not only to cut such a louver but to twist or turn that louver out of the plane of the sheet to form an angle of approximately 80° with the sheet. Not only does the extremely narrow character of the louver elements make the design of a satisfactorily operating machine a grave problem, but the problem is complicated by the fact that the louver elements are turned out of the plane of the sheet, and for production of the material on a commercial basis the screen must be continuously fed through the machine and the strips must be of substantial length, that is, the operation cannot be on sheets of four or five feet in length. Moreover, the cutting and forming dies must be so designed that the sheet need have a movement in one plane only obviating the necessity for lifting the sheet out of the die cavity, as is so customary in all die-formed operations.

To those ends the stationary portion 34 of the cutting and forming means comprises simply an anvil-like die bar 36 mounted in a shoulder recess 37 of the upper and rear corner of the backing support 16, and retained therein by bolts 36a. The bar 36 itself is composed of a high quality die steel and in its operative corner carries a plurality of individual shearing blocks 38 held in position by countersunk screws 39. For a purpose that will later be described in greater particularity the blocks 38 are alternately slightly offset relative to one another, as best seen in Fig. 4. The die bar 36 has other structural features that will be subsequently described.

Carried by the ram 30 and forming a part of the movable portion 35 of the cutting and forming dies are a plurality of blades 40 (see Fig. 3). These blades have a unique shape, as best seen in Fig. 6. Each blade has a shank or attaching portion 41 of a thickness sufficient to provide the necessary strength. Herein this thickness of the shank is shown as approximately $\frac{1}{16}$". The blade proper has a portion 42 immediately adjacent the shank portion which is rectangular in cross section in a plane at right angles to the face of the blade. This rectangular portion 42 herein has a thickness of about $\frac{1}{32}$" or .031". It can be thicker where the mesh of the material runs less than sixteen to the inch, but it cannot well be made less than $\frac{1}{32}$" thick because of the lack of rigidity which is here an important factor. Outwardly of the rectangular portion 42 the blade has a tapering portion 43. The taper occurs on one face only leaving the remaining face to be a uniform continuation of and lie in the same plane with the corresponding face of the rectangular portion 42 and of the shank 41. Inasmuch as Fig. 6 illustrates the blade enlarger many times (more exactly nine times), it is believed well to point out that the total length of the tapering portion 43 of the blade is but $\frac{1}{8}$". The blade tapers down from the $\frac{1}{32}$" thickness of the rectangular portion 32 to a thickness of around .010" and then is rounded as shown at 44 to provide a sharp cutting edge at 45 which nevertheless is quickly expanded to the .010″ thickness to provide strength. It will be apparent from the dimensions given that the tapered face of the portion 43 of the blade forms an angle of about 10° with the opposite face of the blade, or an angle of about 80° with the sheet being cut if the blade as a whole is held perpendicular to the sheet.

Still referring to Fig. 6, there is there shown on the same large scale (nine times normal) sheet material 19 a portion of which has been formed into louvered screen 20. The sheet material is shown as having a thickness of approximately .010″, that is, the thickness of aluminum sheet used for this purpose, and is also the maximum thickness of the three types of materials customarily employed for this louvered screen. The material is also shown as having sixteen louvers 20a to the inch. The louvers 20a are here shown as forming substantially a 90° angle to the plane of the sheet and are also shown as slightly curved rather than flat in transverse cross section. The curved shape of the louver elements 20a of course gives them added strength and rigidity, and the manner in which such strengthening shape is given to the louvers will later be described.

To form screen with sixteen louvers to the inch the sheet-feeding means is adjusted to advance the sheet in increments of 1/16″. In all instances the feed of the sheet is the factor which determines the meshes or louver elements per inch. The feed, of course, could be varied over a wide range but other factors limit the number of louvers per inch to forty or fifty as will presently be described. However, at forty or fifty louvers per inch, the screen is so extremely fine that there is hardly any need for a screen of finer mesh where it is intended to serve the purposes of the material here produced.

Other characteristics of the screen, such as the angle of the louver elements, are not determined by a single factor but by a combination of factors. In the case of the angle or pitch of the louver elements, the width of the louver elements plus the degree of penetration of the sheet by the blade 43 determines the angle or pitch. By way of example, the 16-mesh material shown in Fig. 6 can be taken. As shown in Fig. 6, the stroke of the ram 30 (made variable by any one of several well known means, one example thereof being illustrated in Figs. 8 and 9 wherein the upper end of the ram 30 is provided with a boss 64 defining a vertical undercut guide channel 65 in which a block 66 is secured for vertical adjustment relative to ram 30 by screws 67. A circular cam 68 eccentrically mounted on an output shaft 69 of a drive 70 is received in a corresponding circular recess 71 in the block 66 for vertical reciprocation of the ram, the penetration of the blade 40 at the lower end of the reciprocation being determined by the adjusted position of block 66 on the ram) has been so adjusted that the blade penetrates the sheet to such an extent that the rectangular portion 42 of the blade engages the trailing edge 20b of the louver element. Inasmuch as the rectangular portion of the blade is 1/32″ thick and the louver element is 1/16″ wide, the trailing edge 20b of the louver element is, of course, forced downwardly and, in Fig. 6, counterclockwise as the blade penetrates the sheet further and further until the trailing edge 20b occupies a position midway between the margins of the louver element at its ends. As an incident to this movement of the trailing edge 20b of a louver element being formed, the leading edge 20c moves upwardly and counterclockwise until it also strikes the rectangular portion 42 of the blade. With this particular mesh, thickness of material, thickness of blade and extent of penetration of the material by the blade a substantially 90° twist of each louver element is attained. Depending upon the ductility of the material composing the sheet 19, the louved elements remain substantially in the position to which forced by the blade. There is, of course, some tendency for a louver element to spring back a few degrees. This, however, is compensated for by the fact that the increased stress placed on the material of a louver element by the vertical edges of a blade near the ends of a louver element is such that the trailing edge 20b of a louver element at its center is actually sprung back more than 90° from its initial position in the plane of the sheet. Thus when, due to the resiliency of the material, it comes back a few degrees upon withdrawal of the blade, it ends up substantially at right angles to the plane of the sheet. In order that the vertical edges of the blade may not place too great a stress on the material near the ends of a louver element and cause a tearing of the material, the edges are beveled and slightly rounded to provide for relief at those points. This is indicated in Figs. such as 5 and 2 showing face views of the blades.

Were the movement of the ram 30 or the position of the blade on the ram adjusted to cause progressively smaller penetration of the sheet by the blade, the angle of the louver elements relative to the sheet would likewise be lessened. Not only would the trailing edge 20b be forced less far down and around in a counterclockwise direction but the leading edge 20c would not come as far up and around, with the result that the angle or pitch of the louver elements relative to the plane of the sheet would be lessened more than would appear to be dictated by the 10° angle of the sloping face of the blade. Thus, depending upon the degree of penetration, the louver elements have a pitch varying from substantially 90° at full penetration to 45° when the blade is caused to penetrate the sheet 19 just far enough to have the leading edge 20b of the louver element just clear the rounded tip 44 of the blade.

As the feed of the sheet increases, that is, to reduce the number of louvers per inch, the effect even with full penetration of the blade is the same as partial penetration, namely, the louver elements form a smaller angle with the plane of the sheet. This, of course, could be overcome by employing a thicker blade and making a blade thicker is, of course, no problem. As the feed of the sheet is increased, however, thereby increasing the number of louvers per inch, and correspondingly decreasing the width of each louver element and the spacing between margins of the louver elements, the extent of penetration of the blade becomes an increasingly important factor and has to be very carefully regulated. If, by way of example, the number of louvers per inch is increased to twenty-four, the width of each louver element is now approximately .041″. The blade itself at its rectangular portion 42 is .031″ thick. Thus at full penetration only approximately .010″ is not taken up by the blade and this .010″ is accounted for by the thickness of the material itself. Thus with twenty-four louvers to the inch and full penetration of the blade, the louver elements will still be disposed substantially at right angles to the plane of the sheet, the leading edge 20c will still project upwardly above the sheet, but the twisted portion of the louver elements instead of being rearward of the line where the slit defining the leading edge of the louver elements is made will be substantially in the plane of that line. Stated another way, the louver elements will all be shifted to the right in Fig. 6. With less than full penetration of the blade, the resulting louver elements would, of course, form a somewhat smaller angle with the plane of the sheet and, to the extent that the tapering portion 43 of the blade would at the point of contact of the leading edge of the louver element therewith be less than .031″, the louver element would again shift rearward in the manner of the louver element shown in Fig. 6.

At forty louvers to the inch, each louver would have a width of .025″. With the material .010″ thick, there would remain .015″ to be occupied by the blade before the louver element would, in order for the blade to penetrate the sheet, have to be forced forward beyond the original margin. Inasmuch as the blade tapers down to .010" it will be seen that the tip of the blade plus the thickness of the material is only .020", thereby allowing .005" to compensate for the increased thickness of the blade at the point opposite the leading edge 20c of the louver element. Inasmuch as the louver element is only .025" wide, it will be appreciated that the leading edge 20c of the louver element does not reach much higher up on the blade than the trailing edge 20b and consequently there is not more than .005" increase in thickness in that short distance. Consequently, even at forty louver elements to the inch, the blade may be caused to penetrate the sheet to a point below the plane of the trailing edges 20b of the louver elements in their twisted position and thus the louver elements will take a pitch dictated by the inclination of the sloping face of the portion 43 of the blade or approximately 80° with respect to the plane of the sheet. For material .010" thick and a blade of the dimensions shown and given in Fig. 6, forty louvers per inch is substantially the upper limit if one wishes to obtain substantially an 80° pitch of the louver elements.

For a pitch less than 80° the number of elements per inch may be increased beyond the forty to at least as high as fifty elements per inch where the width of the louver elements would be .020" which would then be taken up by the .010" thickness of the material and the .010" thickness of the blade at its lowermost edge. Under these conditions, the pitch would be determined in large measure by the slope of the beveled or curved portion 44 of the blade.

As indicated in a somewhat exaggerated manner in Fig. 5, a blade is not straight across its cutting edge but is relieved slightly in both directions from the mid-line of the blade in order that the blade may first cut at the middle and then progressively outwardly as it is moved deeper into the material. This materially facilitates the cutting operation as is well understood by those skilled in the art.

The blades are here shown as substantially 1" wide and relieved at each side edge 46 to leave in the sheet a longitudinally extending strip to which the louver elements remain attached at their ends and by which they are supported. The width of a blade is a somewhat arbitrary matter and might be made either narrower or wider with the limits as to width determined by the strength of the individual louver elements. Likewise the extent to which the edges 46 are relieved determines the width of the supporting strip and this again is a matter of choice provided only that the strips must provide sufficient strength.

Of necessity the description of the shape and construction of the blade has been limited to one blade. Actually, as seen in views other than Fig. 6, there are a plurality of blades. These blades are arranged in a row and, depending on how one wished to form the material, the plurality of blades could be, as here shown, arranged in a row extending transversely of the direction of feed of the sheet and all in the plane of the width of the blades or in different ways, which possibilities are contemplated herein but not illustrated or described because so obviously following from the disclosure that has been made.

In a preferred form, as best seen in Figs. 3 and 4, the blades are mounted in two rows with alternate blades offset in the direction of feed of the sheet by one-half the width of the louver element to be formed. This arrangement, of course, staggers or offsets the louver elements in adjacent columns of the formed material by one-half the width of a louver element and thus avoids having the supporting strips weakened by having the slits in the same straight line so that any tearing of the supporting strips would run into a possible tear from the other side of the supporting strip and thus completely sever the same. The offsetting of alternate blades is accomplished through the use of shims 47 of varying thickness, depending upon the width of the louver element being formed. Of necessity the shear blocks 38 are likewise offset and again this is accomplished through the employment of shims 47a.

The blades 40 are held in proper position by means of pins 48 which pass through the blades, the spacing shims 47, and into the ram 30. A heavy plate 49 is then placed over the blades and by means of bolts 50 secured to the ram. The lower margin of the plate 49, as best seen in Fig. 3, fits over a large portion of the lower half of the blades and extends down to a point flush with the lower edge of the ram 30 so as to give to the blades as much rigidity as possible.

Only fragmentary portions of the ram 30 and of the bed and frame of the machine have been shown because the balance of the machine is old and well known. Suffice it to say, therefore, that the ram is reciprocated and has enough force applied to it to cause the blades to cut and form the louver elements. Also the stroke of the ram is adjustable to obtain the desired degree of penetration of the sheet by the blade. The machine should, of course, be so constructed that it is able to handle sheet material of such width that the resulting louvered screen will be wide enough to fit an over-size window.

Reference has been made to a shaping of the louver elements to give them increased strength and rigidity. It is well known, of course, that any thin strip has greater rigidity and bends less easily if it is given some configuration in transverse cross section rather than being permitted to remain perfectly flat or rectangular. To that end, means is herein provided for giving some deformation to the louver elements so as to increase the rigidity and the strength thereof. This means herein is in addition to the cutting and forming means, though operating in conjunction therewith and actually carried thereby. The shaping means is made separate from the blade 40 in order that there need not be a blade for each means for producing a different shape of louver element and in order that the extent of penetration of the blade may be varied without requiring some readjustment of the louver shaping means or the portion of the anvil cooperating therewith. As herein shown, the shaping means comprises stationary dies forming a part of the anvil or die bar 36. Adapted to cooperate with the stationary dies are movable dies 52 carried by the ram 30. Dies 52 are located immediately behind the blades 40 between the blade and the ram or the blade and its shim 47 where the blades are staggered. The movable dies are guided for reciprocatory movement relative to the ram by the pins 48 which pass through slots 51 formed therein. The slots 51 are just wide enough to receive the pins 48 but are long enough so that the movable dies 52 will strike the cooperating stationary dies when the movement of the ram is adjusted so that the blades 40 just barely penetrate the sheet 19, while at the same time not interfering with the penetrating movement of the blades when the ram is adjusted to provide for full penetration of the sheet by the blades. The various shaping dies 52 are urged outwardly relative to the ram 30 by means of compression springs 53 located in sockets 54 in the ram. It will be apparent that with each slitting and forming operation of the blades 40 the shaping die means will cooperate to shape what will be the next louver element to be severed and twisted about the plane of the sheet. The stationary dies are shown as formed by the shear blocks 38, the top surface of each block being suitably recessed.

To permit the sheet to be fed forward in the same plane without necessity for lifting the sheet so as to remove the twisted element from a die cavity, the stationary portion of the cutting and forming means terminates with the shear blocks 38. Thus there is support for the sheet only on the trailing side of a louver element about to be severed and twisted. In order, therefore, to give as much support as possible to the sheet, a presser bar 58 is mounted on the ram 30. Like the die means 52, the presser bar or foot has limited movement, being mounted in guideways on the ram, relative to the ram and is urged outwardly of the end of the ram downwardly against the sheet of material resting on the bar 36 in Fig. 1. This bar 58 has finger-like projections 59 designed to coincide with the space formed by the relieving of the edges 46 of the blades so as to project into those spaces and press down on the sheet at the sides of the blades as well as in back of the blades. The foot is urged downwardly by a heavy compression spring 58a interposed between the foot and a lug 58b on the ram. A rod and nut 58c adjustably limit the outward movement of the foot so that upon retraction of the ram the pressure of the foot on the sheet is relieved to permit advance of the sheet.

It sometimes develops that a material from which screen is to be made is not manufactured in the width desired. This is particularly true of copper and bronze where the sheets are made about 18" wide rather than from 24" to 36" wide which is the normal range of standard windows. Accordingly, means is provided for spotwelding the sheets together as they are simultaneously fed through the machine to have the louver elements cut and formed therein. To that end, the frame of the machine has journaled therein, to be disposed underneath the sheets of material, a roller 61 of some conducting material the roller being adapted to be connected in an electrical circuit. Again carried by the ram 30 is a cooperating electrode 62 mounted on a leaf spring so as to have a degree of yieldability and in turn connected in the welding circuit. The roller 61 and the electrode 62 are so positioned that the overlapping edges of sheets of material will pass therebetween and thus be spotwelded at points spaced by the width of the louver elements being formed.

I claim:

1. In a machine for forming louvered material from a sheet, means for intermittently feeding a sheet in uniform increments, the increments corresponding to the width of the louver elements desired to be formed and said means being adjustable to vary the length of the increments and hence the width of the louver elements; means for slitting the sheet and for turning the resultant elements out of the plane of the sheet to form louver elements including a stationary die portion providing a backing for the unformed portion of the sheet and having a shearing edge extending transversely of the direction of feed of the sheet and a sheet slitting and element twisting blade reciprocable at right angles to the plane of the sheet at the shearing edge of said stationary die portion, said blade over its operative portion having a plane surface on its rear face, a first front face portion extending parallel with said rear face, and a second front face portion outwardly of said first front face portion inclined with respect to said rear face, whereby the blade narrows outwardly; and means for reciprocating said blade in timed relation with the feed of the sheet, the stroke of said last named beans being adjustable to cause the degree of penetration of the sheet by said blade to be proper for twisting the sheet portion engaged thereby a selected amount.

2. A claim according to claim 1 wherein the second front face portion of said blade inclines approximately 10° to said rear face.

3. A claim according to claim 1 wherein the first front face portion of said blade has a length, measured longitudinally, at least equal to the width of the louver element to be formed.

4. A claim according to claim 2 wherein the second front face portion has a length greater than the width of the louver element to be formed.

5. In a machine for forming louvered material from a sheet, means for intermittently feeding a sheet in uniform increments, the increments corresponding to the width of the louver elements desired to be formed and said means being adjustable to vary the length of the increments and hence the width of the louver elements; means for slitting the sheet and for turning the resultant elements out of the plane of the sheet to form louver elements including a stationary die portion providing a backing for the unformed portion of the sheet and having a shearing edge extending transversely of the direction of feed of the sheet and a sheet slitting and element twisting blade reciprocable at right angles to the plane of the sheet at the shearing edge of said stationary die portion, said blade over its operative portion having a plane surface on its rear face, a first front face portion extending parallel with said rear face, and a second front face portion outwardly of said first front face portion inclined with respect to said rear face, whereby the blade narrows outwardly; and means for reciprocating said blade in timed relation with the feed of the sheet, the stroke of said last named means being adjustable to vary the degree of penetration of the sheet by said blade, the degree of penetration being so coordinated with the thickness of the blade and the width of the louver element that the combined value of the thickness of the material and the thickness of the blade at the line of contact of the leading edge of the louver therewith is no greater than the width of the louver element.

6. A machine for forming louvered material from a sheet comprising, in combination, means for intermittently feeding a sheet in uniform increments, the increments corresponding to the width of the louver elements desired to be formed and said means being adjustable to vary the length of the increments, stationary die means providing a backing support for the unformed portion only of a sheet and having a shearing edge extending transversely of the direction of feed of the sheet, a reciprocatory member positioned for movement generally at right angles to the plane of the sheet at said stationary die means, a plurality of blades individually mounted on said reciprocatory member to slit and penetrate the sheet to form the louver elements in cooperation with said stationary die means, said blades being mounted in a pair of rows extending transversely of the direction of feed of the sheet, one of the rows being offset from the other row in the direction of feed of the sheet one-half the width of the louver elements being formed, the blades in each row being spaced from one another a distance slightly greater than the length of each blade and the blades of either row being aligned centrally of the space between successive blades of the other row to form in the sheet a longitudinally extending supporting strip with which the ends of the louver elements are integral and off-set on opposite sides of the strip, means for driving said reciprocatory member in timed relation with the feed of the sheet with penetration of the sheet by the blades being effected during a dwell in the feed of the sheet, and means for adjusting the degree of penetration of the sheet by the blades to cause the angle of the twist of the louver elements relative to the sheet to be a selected angle.

7. A machine for forming louvered material from a sheet comprising, in combination, means for intermittently feeding a sheet in uniform increments, the increments corresponding to the width of the louver elements desired to be formed, means for slitting the sheet and for turning the resultant elements out of the plane of the sheet to form louver elements including a stationary die portion having a shearing edge extending transversely of the direction of feed of the sheet and a sheet slitting and element twisting blade reciprocable generally at right angles to the plane of the sheet at the shearing edge of said stationary die portion, means for shaping a louver element substantially in the plane of the sheet prior to the severing thereof along its trailing edge including a stationary die and a movable die, said movable die being mounted for reciprocation with said blade, and means for reciprocating said blade and said movable die in timed relation with the feed of the sheet, the shaping of a louver element and the penetration of the sheet by the blade occurring during a dwell in the feed of the sheet.

8. In a machine for forming louvered material from a sheet, a plurality of individual stationary die blocks each having an anvil-like portion and a shearing edge, said blocks being mounted with the shearing edge forming a line extending transversely of the machine, a plurality of individual movable dies cooperating with said anvil-like portion of said stationary die block to preshape a louver element substantially in the plane of the sheet, a plurality of blades cooperating with the shearing edge of said die blocks to slit the sheet and turn a louver element out of the plane of the sheet, said blades and said movable dies being mounted on a common member reciprocating toward and from said stationary die blocks to act simultaneously on different portions of the sheet.

9. Means for forming louver elements in a sheet to extend at a selected one of a plurality of angles to the flat plane of the sheet, comprising: means for advancing the sheet in increments corresponding to the width of the louver elements desired to be formed; a blade having a tip, a rear face extending in a plane perpendicular to the flat plane of the sheet and the direction of advance, and a front face extending from the tip generally in a plane inclined to the plane of the rear face whereby the blade thickens from the tip; adjustable means for urging said blade tip through the sheet to cut a slit in the sheet; and means correlating the operation of the sheet advancing means and the blade urging means to cause said front face to twist the portion of the sheet engaged thereby a desired amount about an axis parallel to the flat plane of the sheet and perpendicular to the direction of advancement of the sheet.

10. Means for forming louver elements in a sheet to extend at a selected one of a plurality of angles to the flat plane of the sheet, comprising: adjustable means for advancing the sheet in increments; a blade having a predetermined thickness and terminating in a tip; means for urging said blade tip through the sheet; and means operating the sheet advancing means to advance the sheet a preselected amount which is a function of the thickness of the blade to cause said blade when urged through the sheet to twist the portion of the sheet engaged thereby a desired amount about an axis parallel to the flat plane of the sheet and perpendicular to the direction of advancement of the sheet.

11. Means for forming louver elements in a sheet to extend at a selected one of a plurality of angles to the flat plane of the sheet, comprising: means for advancing the sheet in increments corresponding to the width of the louver elements desired to be formed; a blade having a tip, a rear face extending in a plane perpendicular to the flat plane of the sheet and the direction of advance, and a front face extending from the tip generally in a plane inclined to the plane of the rear face whereby the blade thickens from the tip; adjustable means for urging said blade tip through the sheet any one of a plurality of distances to cut a slit in the sheet; and means operating the blade urging means to effect a preselected penetration of the blade tip through the sheet, which penetration is a function of the angle of said front face, to cause said front face to twist the portion of the sheet engaged thereby a desired amount about an axis parallel to the flat plane of the sheet and perpendicular to the direction of advancement of the sheet.

12. Means for forming in a sheet louver elements having any one of a plurality of widths and extending at any one of a plurality of predetermined angles to the flat plane of the sheet, comprising: means for adjustably advancing the sheet in any one of a plurality of increments corresponding to the width of the louver elements desired to be formed; a blade having a tip, a rear face extending in a plane perpendicular to the flat plane of the sheet and the direction of advance, and a front face extending from the tip generally in a plane inclined to the plane of the rear face whereby the blade thickens from the tip; means for adjustably urging said blade tip through the sheet any one of a plurality of distances to cut a slit in the sheet; and means effecting an amount of penetration of the blade through the sheet which is preselected as a function of the angle of the front face and the amount of advancement of the sheet to cause said front face to twist the portion of the sheet engaged thereby a desired amount about an axis parallel to the flat plane of the sheet and perpendicular to the direction of advancement of the sheet.

13. A method of forming louver elements in a sheet to extend at a selected one of a plurality of angles to the flat plane of the sheet, comprising the steps of: urging a blade tip through the sheet to cut a first slit in the sheet; advancing the sheet a small distance at right angles to the slit and parallel to the flat plane of the sheet; and urging the blade tip through the sheet to cut a second slit in the sheet spaced said small distance from the first slit, said distance being preselected as a function of the thickness of the blade to cause the blade to twist the portion of the sheet between said slits a desired amount about an axis parallel to and intermediate the slits.

14. A method of forming louver elements in a sheet to extend at a selected one of a plurality of angles to the flat plane of the sheet, comprising the steps of: urging the tip of a blade through the sheet to cut a first slit in the sheet; advancing the sheet a small distance at right angles to the slit and parallel to the flat plane of the sheet; urging the blade tip through the sheet to cut a second slit in the sheet spaced said small distance from the first slit; and moving the blade against the edge of the second slit defining one edge of the portion of the sheet between said slits in such a manner as to twist said portion of the sheet a desired amount about an axis parallel to and intermediate the slits.

15. A method of forming louver elements in a sheet to extend at a selected one of a plurality of angles to the flat plane of the sheet, comprising the steps of: urging a wedge-shaped blade tip through the sheet to cut a first slit in the sheet; advancing the sheet a small distance at right angles to the slit and parallel to the flat plane of the sheet; and urging the blade tip through the sheet to cut a second slit in the sheet spaced said small distance from the first slit and cause one inclined face of the wedge-shaped tip to bear against the edge of the second slit defining one edge of the portion of the sheet between said slits and twist the portion a desired amount about an axis parallel to and intermediate the slits.

16. A method of forming louver elements in a sheet to extend at a selected one of a plurality of angles to the flat plane of the sheet, comprising the steps of: urging a wedge-shaped blade tip through the sheet to cut a first slit in the sheet; advancing the sheet any one of a plurality of small distances at right angles to the slit; urging the blade tip through the sheet to cut a second slit in the sheet spaced the selected small distance from the first slit; and causing the wedge-shaped tip to penetrate the sheet a preselected distance to urge the edge of the second slit defining one edge of the portion of the sheet between said slits away from the plane of the sheet the proper distance to twist said portion a desired amount about an axis parallel to and intermediate the slits.

References Cited in the file of this patent

UNITED STATES PATENTS

| | | |
|---|---|---|
| 478,511 | Janssen | July 5, 1892 |
| 885,815 | Wendell | Apr. 28, 1908 |
| 1,090,843 | Golding | Mar. 24, 1914 |
| 1,773,522 | Delery | Aug. 19, 1930 |
| 2,366,224 | Warp | Jan. 2, 1945 |
| 2,596,997 | Harter | May 20, 1952 |
| 2,611,298 | Rowe | Sept. 23, 1952 |
| 2,643,863 | Buschow | June 30, 1953 |
| 2,828,792 | Hill | Apr. 1, 1958 |